Oct. 29, 1935.  M. J. MILLER  2,018,863
AMMONIA RECOVERY
Filed March 28, 1932
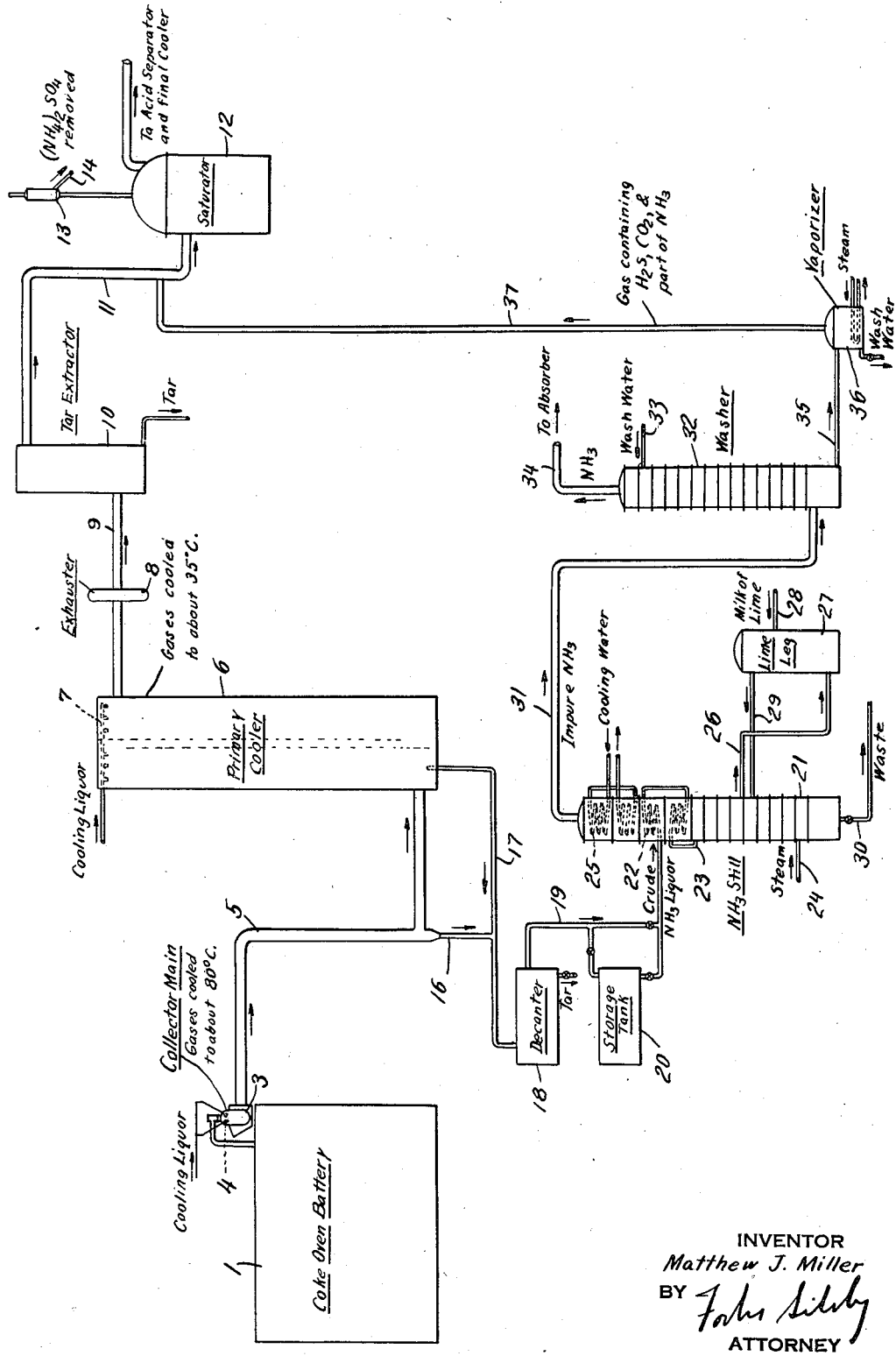
INVENTOR
*Matthew J. Miller*
BY *John Silby*
ATTORNEY Patented Oct. 29, 1935

2,018,863

UNITED STATES PATENT OFFICE 2,018,863

AMMONIA RECOVERY

Matthew J. Miller, Brooklyn, N. Y., assignor to Semet-Solvay Engineering Corporation, New York, N. Y., a corporation of New York Application March 28, 1932, Serial No. 601,551

8 Claims. (Cl. 23—196)

This invention relates to the treatment of volatile products from the destructive distillation of coal and the recovery of ammonia from such products. The invention is especially concerned with improvements in the process known as the semi-direct process for ammonia recovery and with the preparation of a purified ammonia suitable for the direct production of aqua ammonia by absorption in water.

In the semi-direct process for the recovery of ammonia as at present practiced, for example, in the operation of a coke oven plant, hot distillation gases leaving a coke oven battery at a temperature of about 600° C. are collected in a collector main and are therein sprayed with water or ammonia liquor to partially cool them. The gases are then passed through the suction main to a primary cooler. Additional cooling of the gases may take place in the suction main due to dissipation of heat from the main to the surrounding atmosphere, and the spray in the collector main is generally regulated so that the temperature of the gases entering the primary cooler is about 80° C. In the primary cooler the gases are further cooled to about 35° C. This cooling is customarily effected by passing the gases in either direct or indirect heat exchange relation with a cooling medium such as water or ammonia liquor.

The gases leaving the primary cooler contain a major portion of the original total ammonia content together with most of the original carbon dioxide and hydrogen sulfide. The gases therefore, after separation of suspended tar particles, are passed to the ammonia saturator where they are treated with sulfuric acid, thus forming ammonium sulfate from the ammonia contained in the gases, the carbon dioxide and other non-alkaline gases being chemically unaffected. That portion of the ammonia dissolved by the cooling liquor in the collector main and the primary cooler, is delivered to an ammonia still in which it is heated, for example, by the direct injection of steam, in order to liberate the free ammonia from solution. The remaining solution containing fixed ammonia is then treated with lime in order to transform the fixed ammonia present to the free form, and is then returned to the still where this ammonia also is removed. Gases leaving the ammonia still contain ammonia, carbon dioxide and hydrogen sulfide and other gaseous impurities originally present in the crude liquor. The impure ammonia from the ammonia still is then conducted to the saturator together with the gases from the primary cooler in order to extract the ammonia therefrom as sulfate.

In accordance with the above process the entire production of ammonia was obtained in the form of ammonium sulfate. It is frequently desirable, however, to obtain ammonia in the free form, for example, as an aqueous solution, commercially known as aqua ammonia.

It is an object of my invention to provide a simplified process for the purification of ammonia and production of aqua ammonia, and especially adapted for use in a plant employing the semi-direct process for ammonia separation but in which it is desired to obtain a portion of the total ammonia output as free ammonia or as aqua ammonia instead of ammonium sulfate.

According to prior art processes for the production of aqua ammonia, the gases from the destructive distillation of coal are subjected to a washing and cooling treatment to remove substantially all ammonia from the gases. The liquor from such a treatment ordinarily contains large quantities of carbon dioxide and hydrogen sulfide and therefore requires a special purification for the removal of these gases before it can be employed for the preparation of aqua ammonia. My process is to be distinguished from such processes in that I utilize for the production of aqua ammonia only the liquors obtained by a partial cooling of the distillation gases, which liquors contain relatively small amounts of carbon dioxide and hydrogen sulfide compared with the quantity of ammonia present.

In the practice of my invention hot coal distillation gases are partially cooled as in the semi-direct process referred to above. The formation of ammonium carbonate and ammonium sulfide is decreased with elevation of the temperature and consequently the less the gases are cooled, the less will be the formation of these compounds. If the gas is cooled much below 35° C., they may be contained in the resulting liquid in such proportions as to interfere with the subsequent purification, and it is therefore preferred not to lower the gas temperature much below this value in the partial cooling step. The partial cooling of the gases is controlled so that the formation of ammonium carbonate and ammonium sulfide is largely inhibited and consequently the gases retain a major portion of their carbon dioxide and hydrogen sulfide content. The gases may then be passed to an ammonia saturator for the recovery of ammonia from these gases. The liquid resulting from the partial cooling treatment is conducted to an ammonia still where the gaseous constituents, including both free and fixed ammonia, are expelled. These expelled gases, which are composed principally of ammonia together with relatively small quantities of carbon dioxide and hydrogen sulfide and cyanide, are then washed with water in sufficient quantities to remove the impurities present. The washed gas is substantially pure ammonia containing small amounts of water vapor and may be passed directly to an absorber for the production of aqua ammonia. As previously noted, by reason of the fact that my process utilizes liquor resulting from only partial cooling of the gases, this liquor is relatively rich in NH₃ and poor in CO₂ and H₂S. The NH₃ gas obtained by distillation of this liquor will likewise be rich in NH₃ and low in CO₂ and H₂S. This factor is made use of in accordance with my invention in the washing operation wherein, because of the relatively low H₂S and CO₂ content of the gas, these impurities may be substantially completely removed by a quantity of wash water which is insufficient to dissolve a large proportion of the ammonia present.

In order to recover ammonia dissolved in the washing process, the used wash water is heated sufficient to drive off the dissolved gases. Since these gases include relatively large amounts of carbon dioxide, etc., they are not suitable for the direct preparation of aqua ammonia and accordingly may be conducted to the ammonia saturator together with the gases from the primary cooler.

In order that the process of my invention may be more readily understood, I have illustrated diagrammatically one arrangement of apparatus which may be used in carrying out the process.

In the illustrated embodiment of my invention the hot distillation gases from a coke oven battery 1 pass upwardly through the uptake pipes 2 to a collector main 3. The gases enter the collector main at a temperature of about 300–600° C. A cooling liquid, which preferably comprises water or ammonia liquor, is introduced by means of the spray-heads 4. From the collector main 3 the gases pass through the main 5 to the bottom of the primary cooler 6. The volume of liquid introduced by means of the spray heads 4 is preferably regulated so that the gases enter the primary cooler at about 80° C. The primary cooler is shown conventionally in the diagram as comprising a pair of chambers filled with checkerwork and separated by partitions which form a passage from the top of the first chamber to the bottom of the second, sprayheads 7 being provided for the introduction of a cooling liquid. It will, of course, be understood that any suitable type of cooler may be employed. In the primary cooler 6 the gases rise countercurrent to the cooling liquid introduced by means of the sprayheads 7, and are thus further cooled to a temperature of about 35° C. However, the cooling liquid passes countercurrent to the gases in the cooler and therefore may be heated to a temperature considerably in excess of this, for instance to about 60° C., and in some cases nearly to the temperature of the incoming gases, although this will depend on the design and efficiency of the particular cooler employed. In accordance with my invention the temperature of the outgoing liquor from the primary cooler is preferably maintained above about 40° C. to prevent undue absorption of CO₂ and H₂S.

The cooling of the gases in this manner results in the condensation of water vapor from the gases and the removal therewith of a large proportion of the fixed ammonia and comparatively smaller quantities of free ammonia. The cooled undissolved gases, however, contain a major portion of the original total ammonia present, for example, in the neighborhood of 75 per cent thereof and nearly all of the carbon dioxide and hydrogen sulfide and cyanide. These gases are withdrawn from the primary cooler 6 by means of an exhauster 8 and are then passed through conduit 9 to a tar extractor 10 in which suspended tar and other non-gaseous particles are removed. After the removal of suspended matter the gases are passed through pipe 11 to the saturator 12 where they are contacted with sulfuric acid to convert ammonia present to ammonium sulfate. The saturator 12 may be of any conventional type and is illustrated as having an air ejector 13 for the removal of ammonium sulfate through an outlet 14. The gases which are principally carbon dioxide and hydrogen sulfide with perhaps smaller quantities of hydrogen cyanide, and which contain hydrocarbon vapors and possibly entrained acid particles, leave the saturator through the pipe 15 for subsequent treatment.

The liquors from the collector main and primary cooler are conducted by means of pipe lines 16 and 17 to a decanter 18 where tar and other hydrocarbons removed from the gases are separated from the aqueous liquor. The combined liquor or either the aqueous liquor or tar, or both, may, if desired, be cooled and recirculated for cooling of additional gases. The aqueous liquor separated in the decanter 18 contains a major portion of the fixed ammonia originally present in the gases and a very much smaller proportion of the free ammonia, the total ammonia content being, for example, about 25 per cent of the original total ammonia content of the gases, together with a much smaller content of carbon dioxide, hydrogen sulfide and other gaseous impurities. The crude ammonia liquor obtained by the above outlined process under normal operating conditions may contain these constituents in about the following proportions:

| | Grams per liter of solution |
|---|---|
| Fixed ammonia | 9 |
| Free ammonia | 1 |
| Carbon dioxide | .65 |
| Hydrogen sulfide | .45 |

The composition of the ammonia liquor may vary between wide limits depending upon the construction of the particular apparatus employed, the control of cooling liquid and the temperature maintained. In general, however, it is desirable to control the cooling of the gases so that the liquor obtained contains for each part by weight of total ammonia not more than about .5 part by weight of carbon dioxide and hydrogen sulfide taken together.

After the separation of non-aqueous liquor in the decanter 18, the aqueous liquor may be conducted through pipe line 19 to a storage tank 20, or it may be run directly to the ammonia still 21. The temperature at which it enters the ammonia still will vary, depending upon operating conditions, but usually is not above about 30° C. The crude ammoniacal liquor, without any previous purification to remove hydrogen sulfide and carbon dioxide impurities, is introduced into coil 22 of the dephlegmating section of the ammonia still 21, the still 21 being illustrated conventionally as a French column of bell and tray type of construction. The crude liquor is preheated in coil 22 by being passed in indirect heat exchange relation with the ascending ammonia vapors in the still 21. From this preheating coil the hot liquor passes at inlet 23 directly into the top of the heating section of the ammonia still 21 into the bottom of which steam, for instance saturated steam under about ten pounds pressure, is introduced by means of inlet 24. In some cases, for instance when the ammonia liquor is already at a high temperature, the liquor may be introduced directly into the still without passage through the preheating section 22.

As the ammonia liquor descends from tray to tray in the heated portion of the still, its dissolved gaseous constituents separate and rise together with some water vapor through successive sections of the tower. Consequently the concentration of ammonia in the liquor decreases as the liquor descends in the tower. While due to gradual cooling of the ascending gases, the ammonia concentration therein is continually increased. The condensation of water vapor is continued in the dephlegmating section so that the gas leaving the tower is a comparatively concentrated crude ammonia.

In order to maintain accurate control of the temperature of the escaping gases so as to complete the condensation of the water vapor to the desired degree, and to prevent undesired volatile impurities, for example various hydrocarbon derivatives which may be contained in the crude ammonia liquor, from being carried over by the ammonia gas, the cooling coils 25 are provided in the upper portion of the dephlegmating section. Cold water is passed through these coils, the rate of flow being governed by the requirements of the ascending vapors, and generally being regulated so that the gases leave the dephlegmator at a temperature of about 85–95° C. The water-cooled section of the dephlegmator may supplement the preheating section 22 or may take its place entirely, as in the case in which the entering ammonia liquor is already at a high temperature.

As the ammoniacal liquor descends in the still, it continues to give up its ammonia content until it reaches the conduit 26. At this point the remaining ammonia content of the liquor is almost entirely in fixed form. The liquor is, therefore, passed by means of conduit 26 to the prelimer 27, which is of conventional type, where it is subjected to alkalization, that is it is treated with lime or other suitable alkaline agent introduced at 28 to convert the fixed ammonia present to ammonium hydroxide or free ammonia. After this treatment, the ammonia liquor is conducted through conduit 29 back into the ammonia still 21 where the remaining ammonia present is removed in the same manner as the free ammonia discussed above.

The liquor which reaches the bottom of the still is practically devoid of recoverable ammonia and is removed at outlet 30 for suitable disposal.

The concentrated ammonia which ascends to the top of the still column contains substantially all of the gaseous impurities, such as hydrogen sulfide and carbon dioxide originally present, and is therefore passed by means of conduit 31 to the washer 32, entering at the bottom of the washer, which may be a column of bell and tray construction. The gas is passed upwardly counter-current to wash water which is introduced at the inlet 33 at the top of the tower. Additional cooling coils (not shown) may advantageously be provided in each tray to assist in reducing the temperature of the gases. This washing step removes the acidic impurities and carries them together with considerable quantities of ammonia to the base of the tower. The undissolved gas which passes out of the washer through conduit 34 consists of purified ammonia together with some small quantities of water vapor and may be passed directly to an absorber for the production of aqua ammonia or may be used for other purposes for which ammonia is commonly employed.

The wash liquor from the washing tower, commonly known as the "foul ammonia drip", is removed from the base of the tower and passed by means of conduit 35 to the vaporizer 36, which may be of usual construction consisting of a vessel having a coil therein through which steam or other heated fluid may be passed. In the vaporizer the gases, that is the hydrogen sulfide, carbon dioxide, ammonia, hydrocyanic acid, etc. are driven off and are led through the conduit 37 to pipe 11 where they are combined with the gases from the primary cooler 6 and pass to the saturator 12 for the conversion of ammonia, present to ammonium sulfate, the other gases passing out unchanged.

Due to the relatively large proportion of fixed ammonia compared with that of free ammonia present in liquors distilled in accordance with my invention, it sometimes may be advantageous to treat the liquors to release fixed ammonia without previous removal of free ammonia, and then to distill off the entire ammonia content in one operation. In such a process the preheated crude liquor may be run directly to a prelimer and the alkaline liquor thus obtained may be introduced into the ammonia still.

The term "fixed ammonia" is used herein in its generally accepted meaning to cover those compounds of ammonia which are not decomposed by heat alone at the temperatures employed in the ammonia still, but which in alkaline solution yield ammonia. The major portion of the fixed ammonia present in hot coal distillation gases of the class treated according to the process of my invention generally consists of ammonium chloride although, among the other fixed compounds, ammonium thiosulfate and sulfocyanide are also present in considerable quantities.

The term "free ammonia" as used herein is meant to include ammonia itself and also those compounds present in hot coal distillation gases from which ammonia may be liberated by heat in the ammonia still.

I claim:

1. The process for treating hot coal distillation gases which comprises partially cooling the gases to obtain an aqueous liquid containing a portion of the ammonia originally present in the gases and a lesser portion of carbon dioxide and hydrogen sulfide, subjecting the liquid to alkalization and to fractional distillation to remove dissolved gases, washing the gases with a quantity of water sufficient to remove substantially all of the carbon dioxide and hydrogen sulfide contained in the gases, heating the wash water to expel dissolved gases, combining these gases with the partially cooled gases and contacting the combined gases with sulfuric acid.

2. The process for treating fresh hot coal distillation gases which comprises intimately contacting the hot gases with an aqueous liquid to cool the gases to about 35° C., thereby dissolving a portion of the ammonia, carbon dioxide and hydrogen sulfide from the gas, the supply of aqueous liquid being regulated so that the temperature of the outgoing liquid is sufficient to maintain a ratio of dissolved ammonia to dissolved carbon dioxide and hydrogen sulfide therein of at least 2 to 1, subjecting the aqueous solution so formed to alkalization and to fractional distillation to expel dissolved gases, washing the expelled gases with water in sufficient quantity to dissolve carbon dioxide and hydrogen sulfide but not in substantial excess thereof, heating the wash water to expel dissolved gases, combining these gases with the partially cooled coal distillation gases, and contacting the combined gases with sulfuric acid.

3. The process for recovering ammonia from hot coal distillation gases, which comprises partially cooling the gases to obtain an aqueous liquid containing a portion of the ammonia originally present in the gases and a lesser portion of carbon dioxide and hydrogen sulfide, subjecting the liquid to a distillation treatment to remove the ammonia, carbon dioxide, and hydrogen sulfide as gases, washing the gases with a quantity of water sufficient to remove substantially all of the carbon dioxide and hydrogen sulfide contained in the gases but insufficient to dissolve all of the ammonia, separating the wash water from the undissolved ammonia, heating the wash water to expel dissolved gases, and contacting the expelled gases with sulfuric acid.

4. The process for recovering ammonia from hot coal distillation gases, which comprises partially cooling the gases to obtain an aqueous liquid containing a portion of the ammonia originally present in the gases and a lesser portion of carbon dioxide and hydrogen sulfide, subjecting the liquid to alkalization and fractional distillation to remove dissolved gases, washing the gases with a quantity of water sufficient to remove substantially all of the carbon dioxide and hydrogen sulfide contained in the gases but insufficient to dissolve all of the ammonia, separating the wash water from the undissolved ammonia, heating the wash water to expel dissolved gases, and contacting the expelled gases with sulfuric acid.

5. The process for treating hot coal distillation gases, which comprises partially cooling the gases to obtain an aqueous liquid containing a portion of the ammonia originally present in the gases and a lesser portion of carbon dioxide and hydrogen sulfide, withdrawing the liquid from contact with the gases while the temperature of the liquid is not less than about 40° C., subjecting the liquid to a distillation treatment to remove dissolved gases, washing the gases with a quantity of water sufficient to remove substantially all of the carbon dioxide and hydrogen sulfide contained in the gases but insufficient to dissolve all of the ammonia, separating the wash water from undissolved ammonia, heating the wash water to expel dissolved gases, combining these gases with the partially cooled coal distillation gases, and contacting the combined gases with sulfuric acid.

6. The process for treating hot coal distillation gases, which comprises cooling the gases to obtain an aqueous liquid and regulating the cooling so that the temperature of the liquid is sufficient to maintain a ratio of total dissolved ammonia to dissolved carbon dioxide and hydrogen sulfide of at least 2 to 1, subjecting the aqueous liquid to alkalization and to fractional distillation to expel dissolved gases, washing the expelled gases with water in sufficient quantity to dissolve carbon dioxide and hydrogen sulfide but not in substantial excess thereof, separating the ammonia gas from the wash water, heating the wash water to expel dissolved gases, combining these gases with the partially cooled gases, and contacting the combined gases with sulfuric acid.

7. The process for recovering ammonia from hot coal distillation gases, which comprises partially cooling the gases to obtain an aqueous liquid containing a portion of the ammonia originally present in the gases and a lesser portion of carbon dioxide and hydrogen sulfide, subjecting the liquid to a distillation treatment to remove the ammonia, carbon dioxide, and hydrogen sulfide as gases, washing the gases with a quantity of water sufficient to remove substantially all of the carbon dioxide and hydrogen sulfide contained in the gases but insufficient to dissolve all of the ammonia, separating the wash water from the undissolved ammonia, heating the wash water to expel dissolved gases including ammonia, and contacting the expelled gases with an acid to fix the ammonia.

8. The process for treating fresh hot coal distillation gases, which comprises intimately contacting the hot gases with an aqueous liquid to cool the gases to about 35° C., thereby dissolving a portion of the ammonia, carbon dioxide, and hydrogen sulfide from the gas, the supply of aqueous liquid being regulated so that the temperature of the outgoing liquid is sufficient to maintain a ratio of dissolved ammonia to dissolved carbon dioxide and hydrogen sulfide therein of at least 2 to 1, subjecting the aqueous solution so formed to alkalization and to fractional distillation to expel dissolved gases, washing the expelled gases with water in sufficient quantity to dissolve carbon dioxide and hydrogen sulfide but not in substantial excess thereof, heating the wash water to expel dissolved gases including ammonia, and contacting the expelled gases with an acid to fix the ammonia.

MATTHEW J. MILLER.